United States Patent
Lee et al.

(10) Patent No.: US 10,378,685 B2
(45) Date of Patent: Aug. 13, 2019

(54) FAUCET COUPLING STRUCTURE

(71) Applicants: Do Kyeng Lee, Siheung-si, Gyeonggi-do (KR); Choong Bum Ahn, Gongju-si, Chungcheongnam-do (KR)

(72) Inventors: Do Kyeng Lee, Siheung-si (KR); Yong Kyoung Kim, Daegu (KR)

(73) Assignee: DO KYENG LEE CHOONG BUM AHN (KR)

( * ) Notice: Subject to any disclaimer, the term of this patent is extended or adjusted under 35 U.S.C. 154(b) by 188 days.

(21) Appl. No.: 15/661,635

(22) Filed: Jul. 27, 2017

(65) Prior Publication Data
US 2017/0321827 A1 Nov. 9, 2017

Related U.S. Application Data

(63) Continuation-in-part of application No. PCT/KR2016/007918, filed on Jul. 20, 2016.

(30) Foreign Application Priority Data

Jul. 24, 2015 (KR) .................. 10-2015-0105213

(51) Int. Cl.
*F16L 37/091* (2006.01)
*F16L 19/06* (2006.01)
(Continued)

(52) U.S. Cl.
CPC ............ *F16L 19/062* (2013.01); *E03C 1/021* (2013.01); *E03C 1/042* (2013.01); *F16L 19/065* (2013.01); *F16L 37/0915* (2016.05)

(58) Field of Classification Search
CPC ........ F16L 37/0915; E03C 1/021; E03C 1/042
See application file for complete search history.

(56) References Cited

U.S. PATENT DOCUMENTS 9,574,691 B1 * 2/2017 Crompton ........... F16L 37/0915
2012/0098250 A1 * 4/2012 Chang ................. F16L 37/0915
285/18
(Continued)

FOREIGN PATENT DOCUMENTS

CA       2688347 A1 *  7/2010 .......... F16L 37/0915
CA       2869946 A1 *  5/2015 ............. E03C 1/021
(Continued)

OTHER PUBLICATIONS

Korean Office Action (KR 10-2015-0105213), KIPO, dated Feb. 12, 2016.
(Continued)

*Primary Examiner* — David Bochna
(74) *Attorney, Agent, or Firm* — Park & Associates IP Law, P.C.

(57) ABSTRACT

The present invention provides a faucet coupling structure capable of enabling a user to complete the faucet installation by simply inserting the faucet instead of rotating to tighten the faucet, and enabling the user to separate the faucet by holding and rotating the faucet by hand. The user can conveniently install the faucet while adjusting the angular orientation of the faucet to a desired angle. The user can install the faucet by holding and inserting the faucet by hand, and can also separate the faucet by holding and rotating the faucet by hand. As a result, the user can install and separate the faucet without using a tool.

4 Claims, 6 Drawing Sheets

(51) Int. Cl.
*E03C 1/042* (2006.01)
*F16L 19/065* (2006.01)
*E03C 1/02* (2006.01)

(56) References Cited

U.S. PATENT DOCUMENTS

2012/0200081 A1* 8/2012 Reznar .................... E03C 1/021
285/313
2012/0284980 A1* 11/2012 Turnau, III ......... F16L 37/0915
29/237

FOREIGN PATENT DOCUMENTS

| JP | 2000146046 A | * | 5/2000 | .......... F16L 37/0915 |
| JP | 2001073422 A | * | 3/2001 | ............. E03C 1/042 |
| JP | 2014-005596 A | | 1/2014 | |
| KR | 10-2010-0009210 A | | 1/2010 | |
| KR | 10-2010-0063411 A | | 6/2010 | |
| KR | 20-0461766 Y1 | | 8/2012 | |
| KR | 10-1232318 B1 | | 2/2013 | |
| KR | 10-1460254 B1 | | 11/2014 | |
| WO | WO-2016017881 A1 | * | 2/2016 | ............. E03C 1/042 |

OTHER PUBLICATIONS

International Search Report (PCT/KR2016/007918), WIPO, dated Nov. 22, 2016.

* cited by examiner

US 10,378,685 B2

FAUCET COUPLING STRUCTURE

REFERENCE TO RELATED APPLICATIONS

This is a continuation in part of International Patent Application PCT/KR2016/007918 filed on Jul. 20, 2016, which designates the United States and claims priority of Korean Patent Application No. 10-2015-0105213 filed on Jul. 24, 2015, the entire contents of which are incorporated herein by reference.

FIELD OF THE INVENTION

The present invention relates to a structure for coupling a faucet or another liquid supply device to a water/liquid supply source, and more particularly, to a structure for coupling a faucet or another kind of liquid supply device to a water/liquid supply source, in which the faucet (or another kind of liquid supply device) is capable of being conveniently installed or separated without a separate tool.

BACKGROUND OF THE INVENTION

A typical faucet is affixed by a threaded engagement to a connecting body embedded in the wall. As an example of the faucet, Korean Patent Application Publication No. 10-2010-0063411 discloses "A Water Supply Unit Having Stop Function" (Jun. 11, 2010).

As illustrated in FIG. 6, the water supply unit includes a water supply pipe and a connecting body 100 for dispensing water. The water supply pipe is connected to one end of the connecting body 100, and a faucet 300 is connected to the other end of the connecting body 100.

More particularly, the connecting body 100 is installed in a casing embedded in the wall. The connecting body is maintained in a securely fixed state at the installation position. Thus, the connecting body 100 is securely installed without movement in order to fix and support the faucet 300. The connecting body 100 is connected to the faucet 300 by a threaded engagement. The faucet 300 has a fastening pipe portion with a screw thread, and the fastening pipe portion is coupled to the connecting body 100 by a threaded engagement.

Here, a sealing member (not shown) needs to be strongly compressed in order to prevent water from leaking from the point at which the fastening pipe portion and the connecting body are connected each other. For this, during the process of installing the faucet by screw coupling, the faucet needs to be tightened with sufficient force until the faucet does not move any further. However, when the faucet is completely coupled to the connecting body, the faucet is often stopped at an undesired position upon complete rotation of the faucet. It is very difficult to have the faucet positioned at an exact vertical position when the faucet is completely coupled because there exist many determining factors for this, for example, such as elasticity of the sealing member, and the length and number of turns of the screw thread.

Thus, it is often compromised to have the faucet rotated more or less than necessary so that the faucet stops at the exact vertical position. However, if the faucet is rotated more than the optimal degree, an excessive amount of pressure applies to the sealing member, and this causes damages to the sealing member. In contrast, if the faucet is rotated less than the optimal degree, the sealing member cannot be compressed with appropriate pressure, and this causes water to leak.

Meanwhile, a separate tool is required to disassemble the faucet and its components in order to maintain and repair the faucet and other parts after the faucet is installed. However, a workspace is often very narrow due to the limitation in the location where the faucet is installed, and as a result, it is very difficult to use the tool for the disassembling work.

SUMMARY OF THE INVENTION

An object of the present invention is to provide a structure for coupling a faucet or similar device to a water/liquid supply source, in which the structure is capable of enabling a user to install a faucet (or similar device) while adjusting the angle of the faucet (or similar device) to a desired degree when installing the faucet. Another object of the present invention is to provide a faucet coupling structure, which enables the user to conveniently install and uninstall the faucet without a separate tool.

To achieve the aforementioned and other objects, the present invention provides a structure for coupling a faucet or similar device to a water/liquid supply source, capable of enabling a user to completely install a faucet (or similar device) by simply inserting the faucet instead of tightening the faucet, and enabling the user to separate the faucet by holding and rotating the faucet by hand.

According to the present invention, the user can install the faucet by inserting the faucet after adjusting the angle of the faucet to a desired angle. As a result, it is possible to install the faucet while adjusting the installation angle of the faucet to a desired degree. Further, the user can install the faucet by holding and inserting the faucet by hand, and the user can also separate the faucet by holding and rotating the faucet by hand. As a result, the user can install and separate the faucet without using a tool.

DETAILED DESCRIPTION OF THE INVENTION

According to the principles of the present invention, the below described faucet coupling structures are proposed in order to easily install the faucet while freely adjusting the angle of the faucet to set at a preferred position, as well as to enable an easy assembly and detachment of the coupling structure without using special tools to facilitate the maintenance of the components thereof.

In order to accomplish the above described and other objects of the present invention, a faucet coupling structure provides: a faucet with a coupling pipe portion; a connecting body with an annular connecting portion configured to detachably connect to the coupling pipe portion to discharge liquid through the faucet; a fastening nut screw-coupled to the connecting portion; a pressing ring having internal threads in screw engagement to external threads of the coupling pipe portion; and a grab ring configured to grab an outer circumference of the coupling pipe portion to have the coupling pipe portion not to be detached from the connecting portion. The threads of the pressing ring and the coupling pipe portion are configured such that the pressing ring rotates in a direction to couple to the coupling pipe portion when the faucet is rotated in a direction opposite from a coupling direction of the fastening nut. Accordingly, when the faucet is rotated to the coupling direction of fastening nut, the pressing ring reciprocally moves along the coupling pipe portion in a direction toward the grab ring by the screw engagement with each other, and causes the grab ring to expand, and thus, enabling the coupling pipe portion to be detached from the connecting portion. When the faucet is rotated to an uncoupling direction of fastening nut, the pressing ring reciprocally moves along the coupling pipe portion in a direction away from the grab ring until the pressing ring couples completely to the coupling pipe portion by the screw engagement with each other, and then causes the fastening nut to rotate in the uncoupling direction, and thus, enabling the fastening nut to be detached from the connecting portion.

Hereinafter, the present invention will be described in detail with reference to FIGS. 1 to 5.

Figure 1:
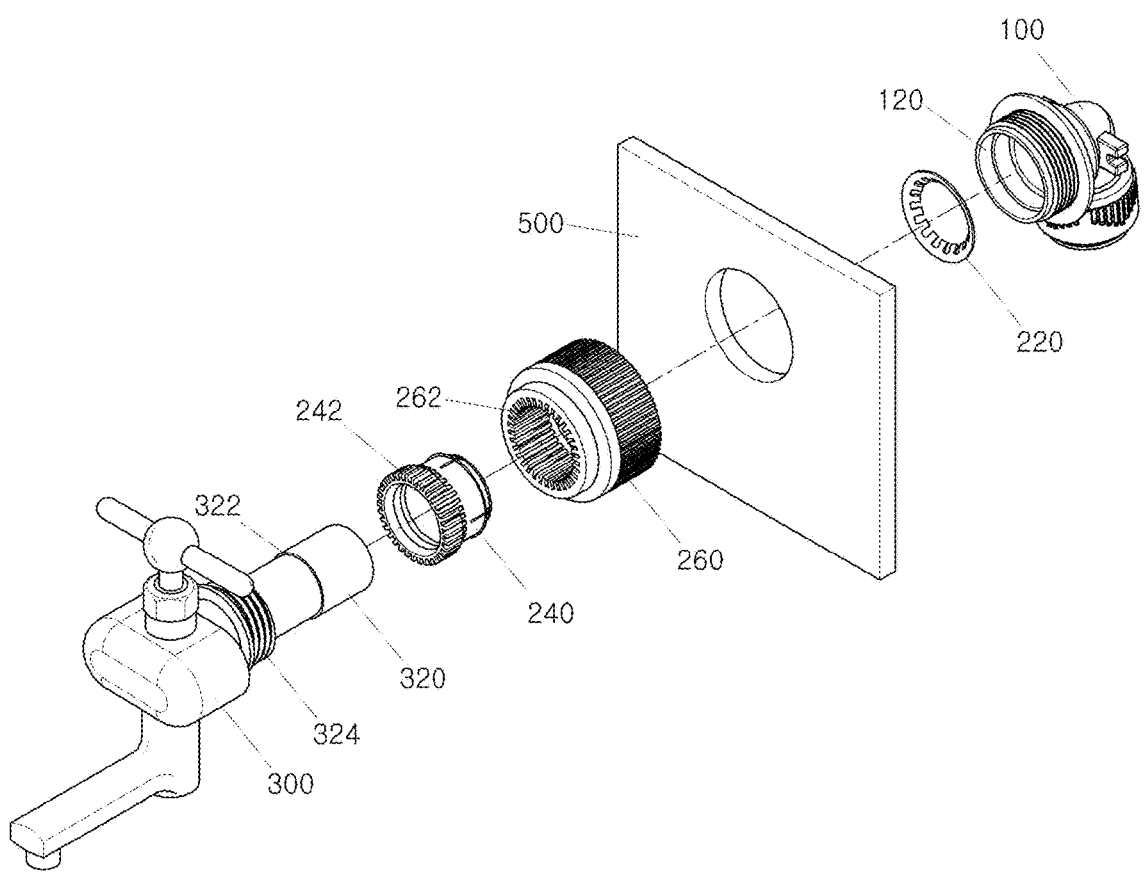
FIG. 1 is an exploded view illustrating a faucet coupling structure according to the present invention.
Figure 2:
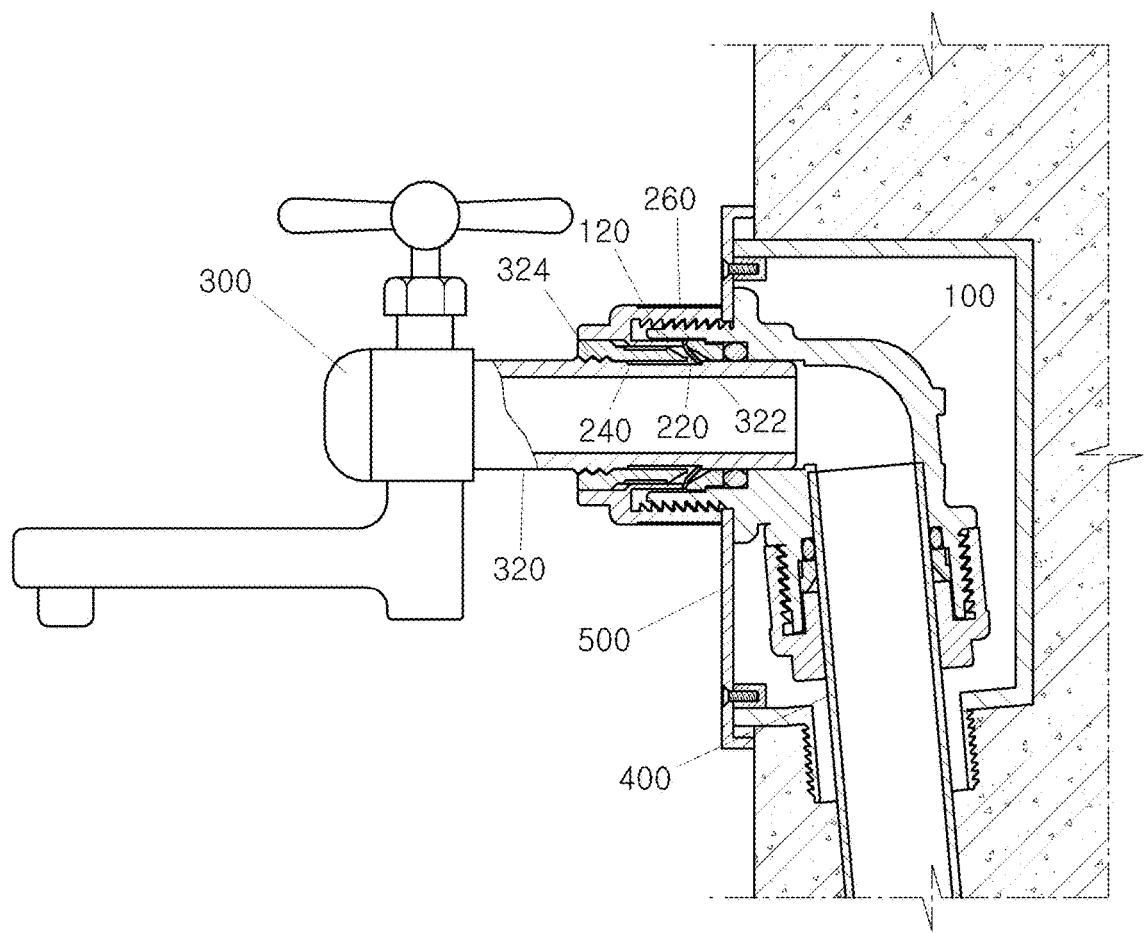
FIG. 2 is a view illustrating a cross section of the faucet coupling structure according to the present invention.
Figure 3:
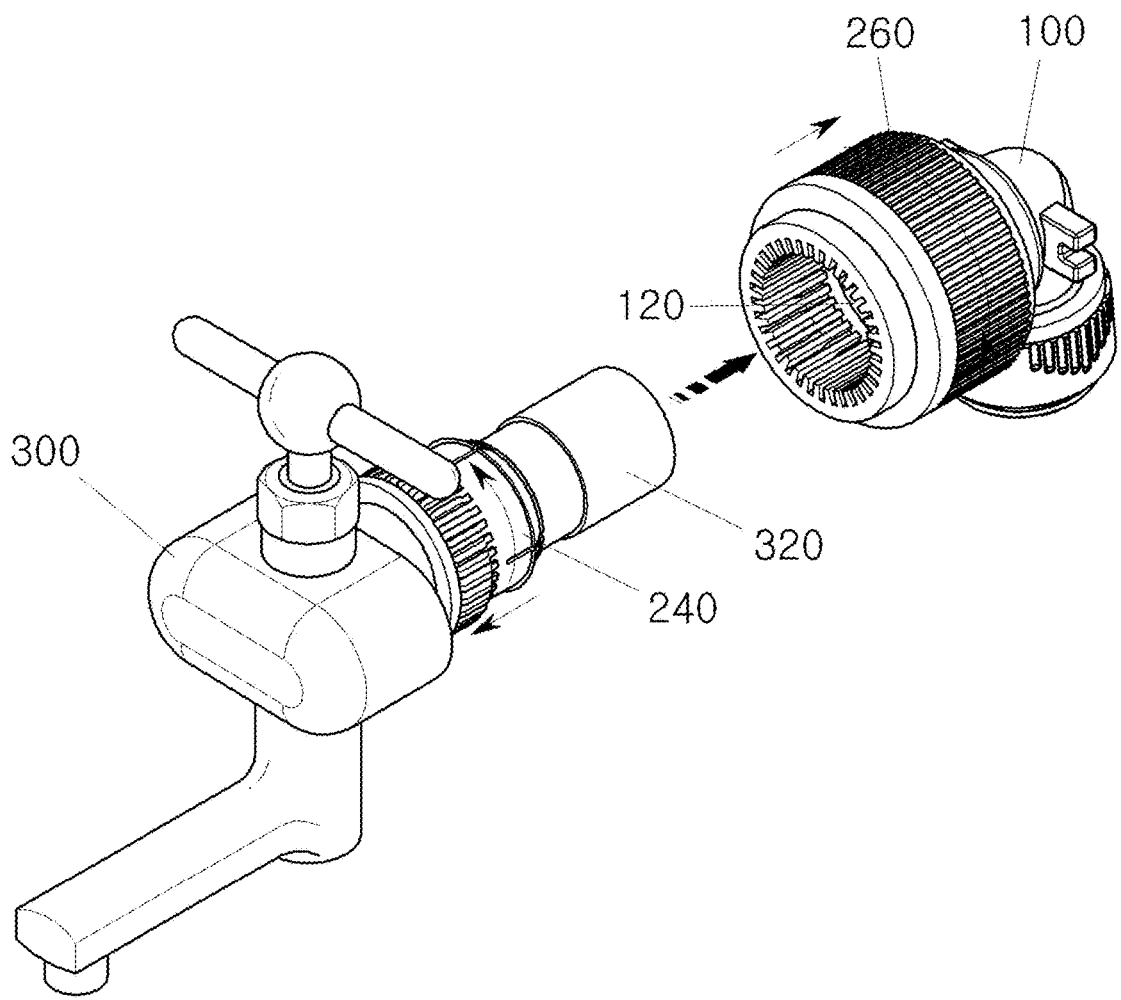
FIG. 3 is a view illustrating a coupling relationship between the faucet and the connecting body, between the pressing ring and the coupling pipe portion, and between the connecting portion and the fastening nut, according to the present invention.

FIG. 1 is a view illustrating a state in which a faucet coupling structure according to the present invention is disassembled, FIG. 2 is a view illustrating a cross section of the faucet coupling structure according to the present invention, and FIG. 3 is a view illustrating the coupling relationship between the faucet and the connecting body, between the pressing ring and the coupling pipe portion, and between the connecting portion and the fastening nut, according to the present invention.

As illustrated in the drawings, according to the faucet coupling structure of the present invention, a faucet 300 is installed to connect to a connecting body 100 which is in turn connected to the water/liquid supply pipe 400 in order to dispense water/liquid through the faucet. Here, the connecting body 100 is embedded in the wall and supplies water/liquid from a water/liquid source.

The connecting body 100 is installed in an accommodation space formed in the wall, such that the connecting body 100 is embedded in the wall so as not to be exposed to the outside. The accommodation space of the wall is typically formed by installing a box-shaped housing having a predetermined dimension when building the wall, and then pouring concrete to the housing. A cover plate 500 is installed to an inlet of the accommodation space, such that the inlet of the accommodation space is covered by the cover plate 500. The cover plate 500 is typically mounted to the inlet of the accommodation space by screw coupling or in a similar manner such that the cover plate 500 can maintain a securely coupled state without being separated.

The connecting body 100 has a connecting portion 120. The connecting portion 120 is exposed to the outside while protruding out from the cover plate 500 affixed to the inlet of the accommodation space. A fastening nut 260 (to be described below) is fastened to the connecting portion 120 exposed to the outside, such that the connecting body 100 is pulled toward the cover plate 500 and securely and tightly supported. Here, the connecting body 100 can also be fixed to the accommodation space of the wall by means of screws so that the connecting body 100 can be fixed more securely.

The faucet 300 has a coupling pipe portion 320. The coupling pipe portion 320 is inserted to the connecting portion 120, such that the faucet 300 can be connected to the connecting body 100 to supply water.

A grab ring 220 is installed in the connecting portion 120. The grab ring 220 has a ring shape and has teeth that protrude toward the center of the grab ring 220. The teeth are inclined toward the interior direction of the connecting portion 120. The grab ring 220 is installed to the coupling pipe portion 320 with the terminal end of the coupling pipe portion 320 penetrating the grab ring 220 which is installed in the connecting portion 120. Thus, when the coupling pipe portion 320 is inserted to the connecting portion 120, the coupling pipe portion 320 is pushed forward, and the end of the coupling pipe portion 320 pushes the teeth and then passes through the grab ring 220.

A catching projection 322 is formed in the outer circumference of the coupling pipe portion 320 inserted through the grab ring 220, such that when the ends of the teeth are caught by the catching projection 322, the coupling pipe portion 320 cannot be further pulled out from the connecting portion 120. On the contrary, when the grab ring 220 is expanded, the teeth are released from the catching projection 322, such that the coupling pipe portion 320 can be pulled out and separated from the connecting portion 120.

The expansion of the grab ring 220 is implemented by a pressing ring 240. The pressing ring 240 has a generally tubular or annular shape with a predetermined length. The pressing ring 240 is detachably installed at the outer circumference of the coupling pipe portion 320. A screw thread 324 is formed at the outer circumference of the coupling pipe portion 320 such that the pressing ring 240 is fastened to the coupling pipe portion 320 by a threaded engagement. The screw thread 324 is formed at a proximal or rear side (left side in the drawings) of the catching projection 322.

The pressing ring 240 is inserted to the coupling pipe portion 320 in a direction from the distal or front end (right side in the drawings) of the coupling pipe portion 320 to the proximal or rear end (left side in the drawings) of the coupling pipe portion 320, and the pressing ring 240 is then fastened to the screw thread 324 of the coupling pipe portion 320. When the coupling pipe portion 320 is inserted into the connecting portion 120 with the pressing ring 240 fastened to the screw thread 324 as described above, the pressing ring 240 is also inserted to the connecting portion 120.

When the pressing ring 240 fastened to the coupling pipe portion 320 is moved forward (to the right side in the drawings), the front end of the pressing ring 240 pushes the teeth of the grab ring 220 to expand. Thus, the teeth are straightened and released from the catching projection 322, such that the coupling pipe portion 320 can be pulled out and separated from the connecting portion 120 by pulling the coupling pipe portion 320 rearward (to the left side in the drawings).

Here, the direction of the screw thread 324 is set in the manner such that the pressing ring 240 (which is thread-coupled to the coupling pipe portion 320) can be tightened and moved rearward while rotating in a direction opposite to the direction in which the fastening nut 260 is tightened. That is, if the fastening nut 260 is configured to be tightened by rotating clockwise, the pressing ring 240 is also configured to be tightened to the coupling pipe portion 320 by rotating clockwise because the direction in which the fastening nut 260 is tightened and the direction in which the pressing ring 240 is tightened should be opposite to each other.

While the pressing ring 240 is thread-coupled to the coupling pipe portion 320 as described, the outer circumference of the pressing ring 240 is engaged with the inner circumference of the fastening nut 260. Engaging configurations (e.g., protrusions 242 and 262) are formed in the outer circumference of the pressing ring 240 and the inner circumference of the fastening nut 260, respectively. The engaging protrusions 242 and 262 are engaged with one another in a state in which a part of the fastening nut 260 protrudes from the end face of the connecting portion 120. The engaging protrusions 242 and 262 can be in the form of a serrated or gear-like structure.

The pressing ring 240 preferably includes a plurality of longitudinal slits (see FIG. 1) formed in its longitudinal terminal end to enable the diameter of the end portion of the pressing ring 240 be elastically reduced. With this configuration, the diameter of the end portion of the pressing ring 240 can be elastically reduced when the pressing ring 240 is inserted to the inlet portion of the connecting portion 120 or the inlet portion of the fastening nut 260 as the coupling pipe portion 320 is coupled to the connecting portion 120. Since the diameter of the end portion of the pressing ring 240 can be elastically decreased, the pressing ring 240 can readily be inserted tto the connecting portion 120. The outer circumference of the coupling pipe portion 320 can include a recessed area of a predetermined depth so as not to hinder the elastic inward deformation of the pressing ring 240.

With the aforementioned configuration, it is possible to couple the faucet 300 to the connecting body 100 while making an adjustment in the angular orientation of the faucet 300 to a desired degree.

As described, in the state in which the connecting body 100 is installed in the accommodation space of the wall, the cover plate 500 is fixed to the inlet area of the accommodation space. The fastening nut 260 is then fastened to the connecting portion 120 which is exposed to the outside through the opening of the cover plate 500. In this state, the angular position of the faucet 300 is firstly adjusted to a desired degree, and then the coupling pipe portion 320 on which the pressing ring 240 is installed is pushed to install to the inner area of the connecting portion 120 while maintaining the set angular position of the faucet 300. As a result, the engaging protrusions 242 and 262, which are formed in the outer circumference of the pressing ring 240 and the inner circumference of the fastening nut 260, respectively, are engaged with each other. At this time, the front end of the coupling pipe portion 320 passes through the grab ring 220, and the grab ring 220 is caught by the catching projection 322 of the coupling pipe portion 320. Thus, the coupling pipe portion 320 cannot be pulled out of the connecting portion 120, and the rotation of the faucet 300 is also inhibited by the engaging protrusions 242 and 262, and in this manner, the faucet 300 can conveniently be installed in the desired angular orientation.

Figure 4:
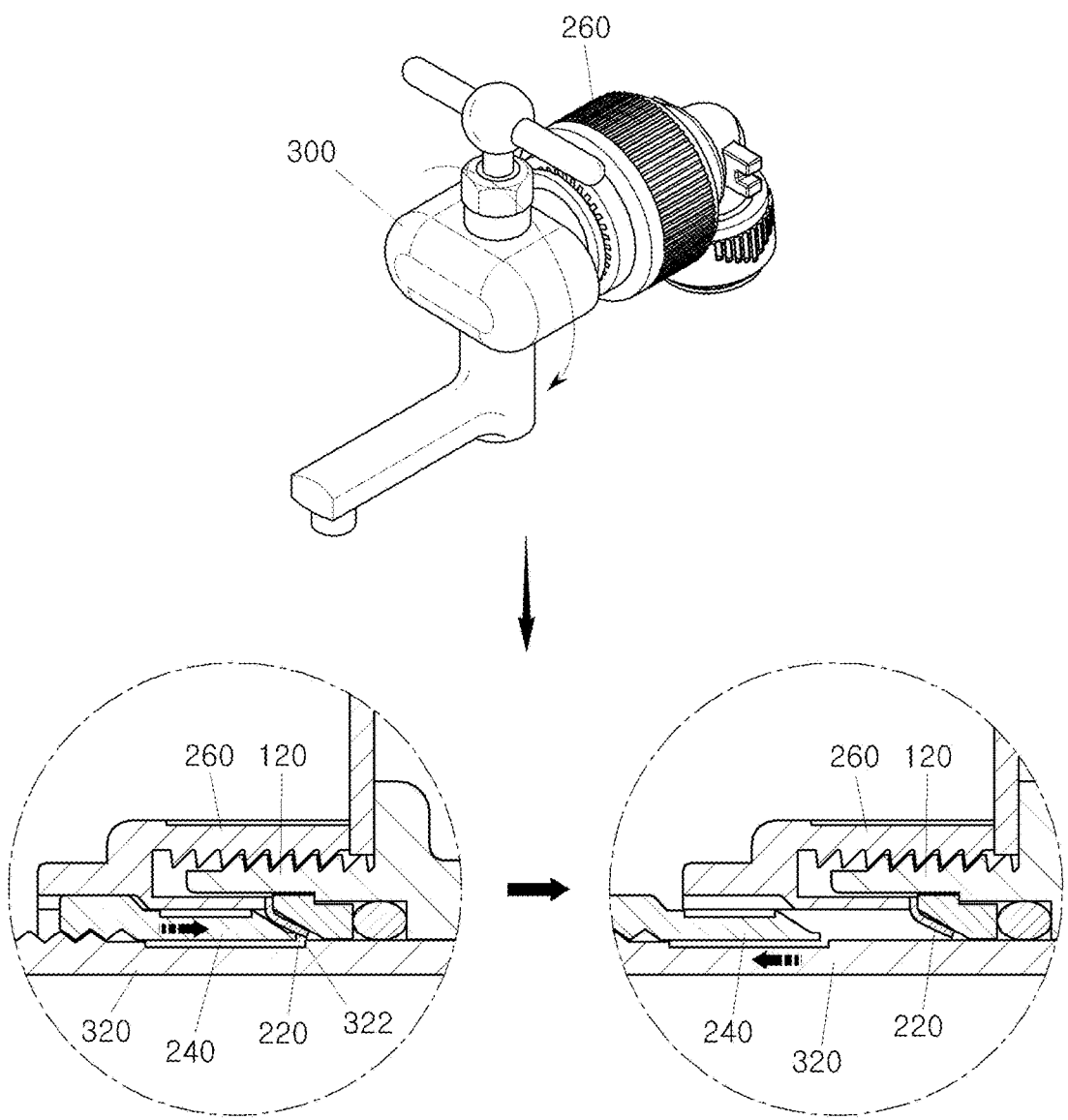
FIG. 4 is a view illustrating the separating operation of the coupling pipe portion from the connecting portion by rotating the faucet, according to the present invention.

FIG. 4 is a view illustrating the separating operation of the coupling pipe portion 320 from the connecting portion 120 by rotating the faucet according to the present invention.

As described above, the faucet 300 is not to be separated from the connecting body 100 only by simply pulling the faucet 300 in the state in which the faucet 300 is coupled to the connecting body 100 as the coupling pipe portion 320 is inserted into the connecting portion 120. The reason that the faucet 300 is not to be separated from the connecting body 100 is because the grab ring 220 is caught by the catching projection 322.

In this state, when a user holds the faucet 300 by hand and rotates the faucet 300 in the direction in which the fastening nut 260 is tightened, that is, clockwise direction, the pressing ring 240 moves forward. Here, the user can securely hold the faucet 300 by hand and rotate the faucet 300 without using a separate tool.

More specifically, the fastening nut 260 rotates in a tightening direction when the user rotates the faucet 300 clockwise, and the fastening nut 260 is not to be rotated any further when the fastening nut 260 is completely tightened to the end. In this state, only the coupling pipe portion 320 can be rotated as the rotation of the pressing ring 240 is inhibited since the pressing ring 240 is engaged with the fastening nut 260. Then, the resulting force is applied to the pressing ring 240 in the direction in which the pressing ring 240 is released (that is, the rightward direction in the drawings) as the pressing ring 240 is thread-coupled to the coupling pipe portion 320. As a result, the pressing ring 240 moves forward toward the grab ring 220.

As the pressing 240 moves forward as described above, it pushes and expands the grab ring 220, and the grab ring 220 is released from the catching projection 322. In this state, the faucet 300 is pulled rearward, and the coupling pipe portion 320 can be pulled out and detached from the connecting portion 120, and as a result, the faucet 300 is separated therefrom.

When the faucet 300 is separated as described above, the angle of the faucet 300 can be re-adjusted to a desired degree, and then, the coupling pipe portion 320 can be re-inserted back to the connecting portion 120, such that the angle of the faucet 300 can be conveniently adjusted.

Figure 5:
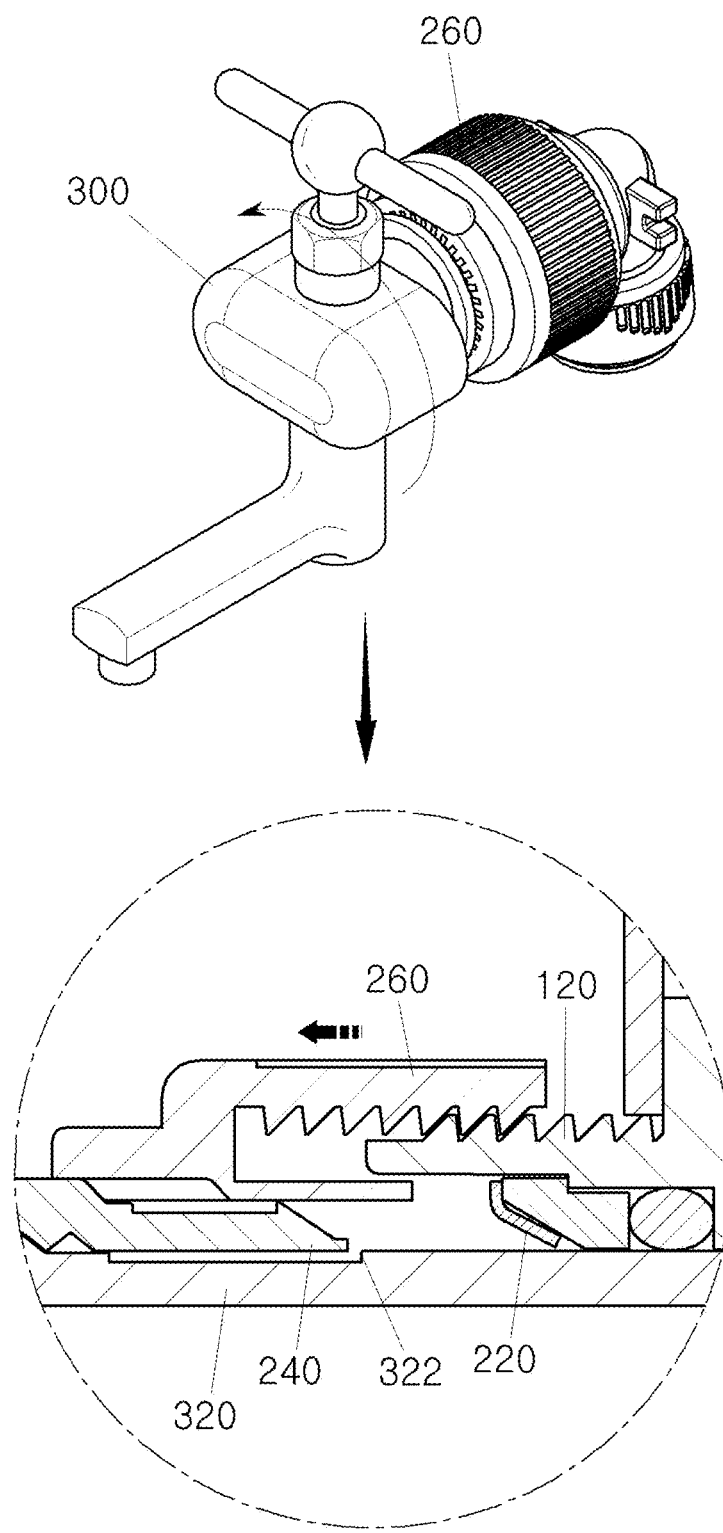
FIG. 5 is a view illustrating the separating operation of the fastening nut from the connecting portion by rotating the faucet, according to the present invention.
Figure 6:
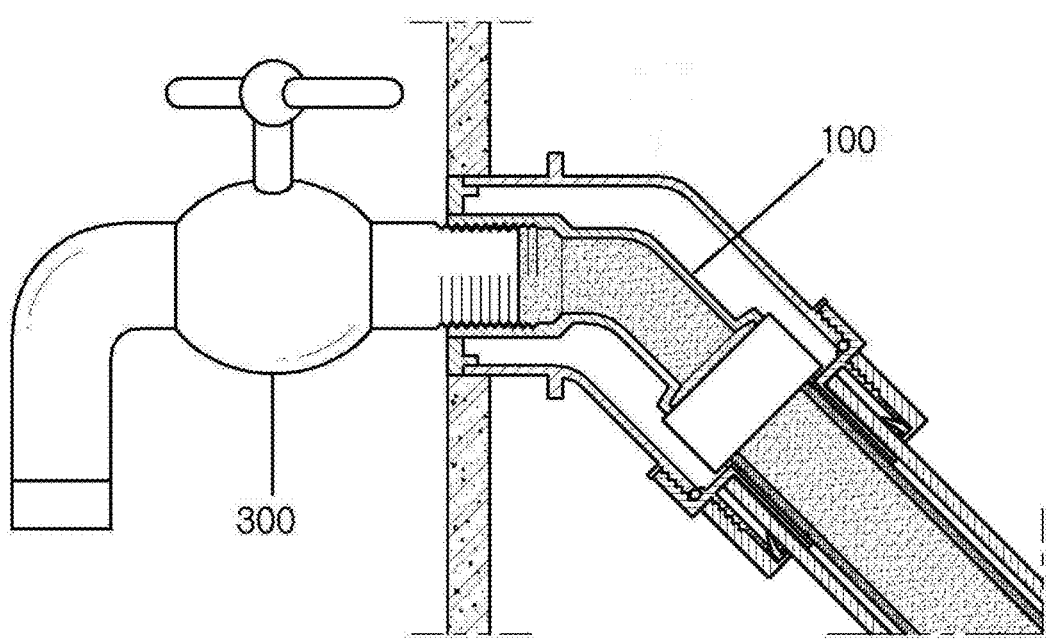
FIG. 6 is a view illustrating a faucet coupling structure in the related art.

FIG. 5 is a view illustrating a separating operation of the fastening nut from the connecting portion by rotating the faucet according to the present invention.

When the faucet 300 is rotated in the direction in which the fastening nut 260 is released, that is, counterclockwise direction, the fastening nut 260 can be separated from the connecting portion 120.

For this, the user first rotates the faucet 300 clockwise so that the pressing ring 240 pushes and expands the grab ring 220. Then, the user pulls the faucet 300 rearward to a certain degree to cause the grab ring 220 not to be caught by the catching projection 322. As a result, the grab ring 220 is released from the catching projection 322, while the pressing ring 240 and the fastening nut 260 are engaged to each other. The user then rotates the faucet 300 counterclockwise, and the pressing ring 240 rotates together with the faucet 300 without idling because force is applied to the pressing ring 240 in the direction in which the pressing ring 240 is tightened. As a result, the fastening nut 260 engaged with the pressing ring 240 releases from the connecting portion 120 while rotating together with the pressing ring 240.

According to the present invention, the user can install the faucet by simply inserting the faucet after adjusting the angular position of the faucet to have its angular orientation at a desired angle. As a result, it is possible to install the faucet while adjusting the installation angle of the faucet to a desired degree. Moreover, the user can install the faucet by holding and inserting the faucet by hand, and the user can also separate the faucet by holding and rotating the faucet by hand. As a result, the user can install and separate the faucet without using a tool.

What is claimed is:

1. A structure for coupling a faucet to a liquid supply device, comprising:
   a faucet configured to discharge liquid and having an end with a coupling pipe portion extending in a longitudinal direction;
   a connecting body of generally tubular shape, the connecting body having a first end with a connecting portion of generally annular shape extending in a longitudinal direction, and a second end for connecting to a liquid supply source to discharge liquid through the faucet, wherein the coupling pipe portion of the faucet is detachably coupled to the connecting portion;
   a fastening nut of generally annular shape, the fastening nut screw-coupled to the connecting portion;
   a pressing ring of generally annular shape disposed between the coupling pipe portion and the fastening nut, wherein the pressing ring has internal threads in screw engagement to external threads of the coupling pipe portion, the threads of the pressing ring and the coupling pipe portion configured such that the pressing ring rotates in a direction to couple to the coupling pipe portion when the faucet is rotated in a direction opposite from a coupling direction of the fastening nut, and wherein the pressing ring and the fastening nut include engaging configurations configured to selectively couple to each other by a reciprocal movement of the pressing ring; and
   a grab ring installed in an internal area of the connecting portion and configured to grab an outer circumference of the coupling pipe portion so as to have the coupling pipe portion not to be detached from the connecting portion,
   wherein, when the faucet is rotated to the coupling direction of fastening nut, the pressing ring reciprocally moves along the coupling pipe portion in a direction toward the grab ring by the screw engagement between the pressing ring and the coupling pipe portion, and then causes the grab ring to expand, and thus, enabling the coupling pipe portion to be detached from the connecting portion,
   wherein, when the faucet is rotated to an uncoupling direction of fastening nut, the pressing ring reciprocally moves along the coupling pipe portion in a direction away from the grab ring until the pressing ring couples completely to the coupling pipe portion by the screw engagement between the pressing ring and the coupling pipe portion, and then causes the fastening nut to rotate in the uncoupling direction, and thus, enabling the fastening nut to be detached from the connecting portion.

2. The structure of claim 1, wherein the engaging configurations are in the form of engaging serrations or gears formed in the pressing ring and the fastening nut.

3. The structure of claim 1, wherein the coupling pipe portion includes a catching projection, and the coupling pipe portion is not detachable from the connecting portion when the grab ring is caught by the catching projection.

4. The structure of claim 3, wherein the pressing ring includes a plurality of longitudinal slits formed in its terminal end to enable the diameter of the end portion of the pressing ring to be elastically reduced.

\* \* \* \* \*